(12) United States Patent
Hodgson et al.

(10) Patent No.: US 10,072,547 B2
(45) Date of Patent: Sep. 11, 2018

(54) PUMP FOR CONVEYING A FLUID, IN PARTICULAR FOR CONVEYING AN EXHAUST GAS CLEANING ADDITIVE

(71) Applicant: CONTINENTAL AUTOMOTIVE GMBH, Hannover (DE)

(72) Inventors: Jan Hodgson, Troisdorf (DE); Yves Kopp, Remering-les-Puttelange (FR); Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 162 days.

(21) Appl. No.: 15/127,091

(22) PCT Filed: Mar. 18, 2015

(86) PCT No.: PCT/EP2015/055666
§ 371 (c)(1),
(2) Date: Sep. 19, 2016

(87) PCT Pub. No.: WO2015/140206
PCT Pub. Date: Sep. 24, 2015

(65) Prior Publication Data
US 2017/0114691 A1  Apr. 27, 2017

(30) Foreign Application Priority Data
Mar. 19, 2014 (EP) .................................. 14290069

(51) Int. Cl.
*F01N 3/10* (2006.01)
*F04C 5/00* (2006.01)
(Continued)

(52) U.S. Cl.
CPC ........... *F01N 3/2066* (2013.01); *F01N 3/206* (2013.01); *F04C 5/00* (2013.01); *F04C 15/0003* (2013.01);
(Continued)

(58) Field of Classification Search
CPC .... F01N 3/2066; F01N 3/206; F01N 2610/02; F01N 2610/1406; F01N 2610/1433;
(Continued)

(56) References Cited

U.S. PATENT DOCUMENTS

| 2,544,628 A | 3/1951 | Copping |
| 3,408,947 A | 11/1968 | McMillan |
| 3,583,838 A * | 6/1971 | Stauber .................. F04B 43/14 417/476 |
| 4,332,534 A | 6/1982 | Becker |

(Continued)

FOREIGN PATENT DOCUMENTS

| DE | 2853916 A1 | 6/1980 |
| DE | 3815252 A1 | 11/1989 |

(Continued)

*Primary Examiner* — Phutthiwat Wongwian
*Assistant Examiner* — Kelsey Stanek
(74) *Attorney, Agent, or Firm* — Laurence A. Greenberg; Werner H. Stemer; Ralph E. Locher

(57) ABSTRACT

A pump for conveying a fluid includes a pump housing with an inlet, an outlet, an inner circumferential surface and a geometric axis. An eccentric is rotatable in the housing around the geometric axis. A deformable element is disposed in a pump gap between inner and outer surfaces of the eccentric. A conveying channel is formed from inlet to outlet by the deformable element and the inner circumferential surface. The deformable element is pressed in sections against the housing by the outer eccentric surface, forming a displaceable seal of the channel and a closed pump volume in the channel being displaceable by rotation of the eccentric for conveying the fluid along the channel from inlet to outlet. The deformable element has a protrusion on one or both sides towards the geometric axis extending over the outer eccentric surface and contacting the deformable element. A centering ring is inside the protrusion.

13 Claims, 5 Drawing Sheets

(51) Int. Cl.
 *F01N 3/20* (2006.01)
 *F04C 15/00* (2006.01)
 *F04C 15/06* (2006.01)
(52) U.S. Cl.
 CPC .......... *F04C 15/06* (2013.01); *F01N 2610/02* (2013.01); *F01N 2610/1406* (2013.01); *F01N 2610/1433* (2013.01); *F01N 2610/1453* (2013.01); *F04C 2210/1083* (2013.01); *F04C 2220/24* (2013.01); *F04C 2240/30* (2013.01)
(58) Field of Classification Search
 CPC ................ F01N 2610/1453; F04C 5/00; F04C 15/0003; F04C 15/06; F04C 2210/1083; F04C 2220/24; F04C 2240/30
 USPC .......................................... 60/301
 See application file for complete search history.

(56) References Cited

U.S. PATENT DOCUMENTS

| | | | |
|---|---|---|---|
| 5,006,049 A | | 4/1991 | Von Der Heyde et al. |
| 5,988,998 A | * | 11/1999 | Glover ............... F04C 5/00 418/153 |
| 2014/0017094 A1 | * | 1/2014 | Ghodsi-Kameneh ................ F01C 21/08 417/44.1 |

FOREIGN PATENT DOCUMENTS

| | | | |
|---|---|---|---|
| EP | 0819853 | A2 | 1/1998 |
| WO | 2012126544 | A1 | 9/2012 |

* cited by examiner

PUMP FOR CONVEYING A FLUID, IN PARTICULAR FOR CONVEYING AN EXHAUST GAS CLEANING ADDITIVE

BACKGROUND OF THE INVENTION

Field of the Invention

The invention relates to a pump for delivering a liquid which is suitable, in particular, for delivering an exhaust gas purification additive (such as urea/water solution) into an exhaust gas treatment apparatus for purifying the exhaust gases of internal combustion engines.

Exhaust gas treatment apparatuses, in which a liquid additive is used for exhaust gas purification, are widespread, for example, in the automotive sector; in particular, nitrogen oxide compounds are also to be removed from the exhaust gas. In exhaust gas treatment apparatuses of this type, the so-called SCR method is carried out (SCR=Selective Catalytic Reduction). In the SCR method, nitrogen oxide compounds in the exhaust gas are reduced by way of a reducing agent (normally ammonia). Ammonia is often not stored directly in the motor vehicle, but rather in the form of a liquid (exhaust gas) additive which is converted to form ammonia outside the exhaust gas (in an external reactor which is provided specifically for this purpose) and/or inside the exhaust gas (in the exhaust gas treatment apparatus). Urea/water solution is preferably used as liquid additive in this context. A urea/water solution having a urea content of 32.5% is available under the commercial name AdBlue®.

The liquid additive is usually stored in a tank in the motor vehicle and is added to the exhaust gas treatment apparatus by means of a delivery module. A delivery module comprises, in particular, a pump. Furthermore, the delivery module can also be assigned the following components, inter alia: filter, sensor, valve and/or metering unit.

It is a problem in a delivery module for liquid additive that said additive can freeze at low temperatures. A 32.5% urea/water solution freezes, for example, at −11° C. Low temperatures of this type can occur in the automotive sector, in particular during long parked phases in winter. When the additive freezes, an increase in volume occurs which can damage or even destroy the lines, channels and/or components of the delivery module. Here, in particular, the pump is also the focus. The destruction of the pump can be avoided, for example, by virtue of the fact that the delivery module is emptied upon deactivation, with the result that no liquid additive remains in the delivery module during a standstill phase. Another procedure for protecting the pump is to design the components (flexibly) in such a way that no damage can occur as a result of the volume expansion of the liquid additive when it freezes.

It is technically difficult, in particular within the pump, to ensure measures for freeze protection because the pump has to be in intensive contact with the liquid additive. Moreover, complete emptying of the pump is often problematic because restarting of the delivery after an operating stop is made considerably more difficult as a result. In addition, the pump for delivering liquid additive should be inexpensive and should have great durability. This comprises, in particular, high reliability and a low probability of failure and low ageing, this meaning, in particular, a change in the operating behavior in the pump as a result of wear.

Moreover, an exact delivery quantity supply capability is possibly also important in the pump. This and the expression "metering accuracy" mean here, in particular, that the liquid quantity actually delivered by the pump is predefined precisely by clearly determinable input variables, the term "input variables" describing here, in particular, the electric actuation of the drive of the pump (voltage profile and/or current profile for driving the pump, frequency of current pulses for driving the pump, etc.). It is important, in particular, that the number and/or relevance of cross-influences which influence the dependence of the delivery quantity on the input variables is kept low. Cross-influences of this type could be, for example, the temperature of the pump, the pressure in the pump, etc. If significant cross-influences cannot be avoided, the effect of said cross-influences on the delivery quantity should be capable of being calculated and/or controlled as accurately as possible. The metering accuracy of a pump can be described, for example, by way of a statistical deviation between an expected, desired delivery quantity and an actually delivered delivery quantity. For example, a pump has a high metering accuracy if said deviation is on average less than 10%. Metering accuracy can be considered to be low (for urea/water solution delivery quantities in the SCR method), for example, if said deviation is on average more than 20%. Said percentage values are to be understood in each case to be merely an example.

Documents U.S. Pat. No. 2,544,628, U.S. Pat. No. 3,408,947, DE 285 39 16 A1 and DE 381 52 52 A1 have disclosed a pump type which is also called an orbital pump. Said pump type is firstly comparatively resistant to a volume expansion of a liquid upon freezing; secondly, said pump type can also be operated with a reversed delivery direction, with the result that emptying of a delivery module is possible in a technically simple manner. There is the need, however, to adapt said pump type to the requirements in the context of the SCR method, in particular with regard to the metering accuracy and/or the ageing behavior (for example, as a consequence of considerable stress states in the pump diaphragm).

BRIEF SUMMARY OF THE INVENTION

Proceeding herefrom, it is an object of the present invention to propose a particularly advantageous pump for delivering a liquid, which pump at least partially solves the above problems and is suitable, in particular, for delivering liquid additives for exhaust gas purification (such as urea/water solution).

This object is achieved by way of a pump in accordance with the features described below. Further advantageous refinements of the pump are specified below as well. It is to be noted that the features which are recited in the individual patent claims can be combined with one another in any desired, technologically appropriate way and can be supplemented by explanatory facts from the description, further design variants of the pump being illustrated.

A pump for delivering a liquid is proposed, which pump has at least one pump housing with a rotationally symmetrical inner circumferential face with a geometric axis and with at least one inlet and at least one outlet: an eccentric is arranged within the pump housing, which eccentric can be rotated relative to the pump housing about the geometric axis, an (annular) deformable element being arranged in a pump gap between the inner circumferential face of the pump housing and an outer face of the eccentric, and a delivery channel from the at least one inlet to the at least one outlet being configured by way of the deformable element and the inner circumferential face of the pump housing, and, furthermore, the deformable element being pressed against the pump housing in sections by the outer face of the eccentric in such a way that at least one displaceable seal of the delivery channel and at least one closed pump volume in the delivery channel are formed, which, in order to deliver the liquid, can be displaced along the delivery channel from the inlet to the outlet by way of a rotation of the eccentric, the deformable element having a projection on one or both sides in the direction of the geometric axis beyond that outer face of the eccentric which makes contact with the deformable element and having a centering ring on the inside in at least one projection.

A pump having said construction can also be called an orbital pump.

The pump has a (central) geometric axis, around which the eccentric can be rotated. For this purpose, a drive shaft preferably runs along the drive axis, which drive shaft connects the eccentric to an (electrically operable) drive. The drive is preferably arranged along the axis above and/or below the pump housing. For the spatial description of the pump and its components, a radial direction is assumed in the following text which lies perpendicularly on the geometric axis of the pump and, starting from the geometric axis of the pump, extends in the radial direction toward the outside. A circumferential direction is to be defined perpendicularly with respect to the geometric axis and with respect to the radial direction tangentially with respect to the inner circumferential face of the pump housing. The delivery channel runs from the inlet and to the outlet of the pump at least in sections along said circumferential direction through the pump housing or along the inner circumferential face of the pump housing. For further description of the pump, a center plane of the pump is also defined. Said center plane is arranged perpendicularly with respect to the geometric axis. The pump housing, the eccentric, the deformable element and the delivery channel lie in the center plane.

The pump housing of the pump is preferably constructed in the manner of a ring or a cylindrical chamber, in which the eccentric is arranged on the inside. The pump housing can also be considered to be an (outer) stator of the pump, the eccentric being denoted as the (inner) rotor. In the sense of a kinematic reversal, the invention is also to include constructions of the type, in which the pump housing with the inlet and the outlet lies on the inside and the eccentric circulates on the outside, the pump gap being situated between the outer circumferential face of the inner pump housing and an inner face of the eccentric, and the at least one centering ring being situated on the outside on a projection of the deformable element. It is possible according to said embodiment of the pump that the pump housing forms an inner stator which is surrounded by the eccentric. The eccentric then forms an outer rotor. The inlet and the outlet are arranged on the pump housing and make the inflow and the outflow of the liquid into/out of the pump housing and/or into/out of the delivery channel possible.

The pump housing is preferably made from plastic. Reinforcing structures can be integrated into the pump housing. In one preferred design variant, an annular metallic insert which stiffens the pump housing is integrated into a pump housing made from plastic.

Here, the term "eccentric" means, in particular, a circular structure which is arranged eccentrically (off-center) with respect to the geometric axis and carries out an eccentric movement as a result of a rotation about the geometric axis. An annular or circumferential pump gap is formed between the pump housing and the eccentric, in which pump gap the deformable element is arranged. The delivery channel is arranged (within the gap) between the deformable element and the pump housing and is delimited by the pump housing and the deformable element. The pump gap has at least one constriction which is displaced along the pump housing and/or along the delivery channel by way of a rotation of the eccentric. The deformable element is pressed against the housing at the constriction, with the result that the displaceable seal is formed there. What are known as "polyvalent" eccentrics are also included here, which form a plurality of constrictions of the pump gap between the pump housing and the eccentric. "Polyvalent" eccentrics of this type can be formed, for example, by way of a plurality of rollers which roll on the inside on the deformable element and form the constrictions. The surface of the rollers then forms the outer face of the eccentric. The delivery channel has a channel cross section, through which liquid can flow, between the pump housing and the deformable element, which channel cross section can be, for example, (depending on the size of the pump) between 1 mm$^2$ [square millimeter] and 50 mm$^2$ at the largest point.

The delivery channel is preferably configured so as to be annular or circumferential about the axis. The inlet and the outlet are preferably arranged in a delivery direction of the pump at an angular spacing of more than 270° with respect to one another (measured in the center plane). Counter to the delivery direction, the inlet and the outlet therefore have an angular spacing of less than 90° with respect to one another.

The eccentric is preferably of multiple-piece configuration. The eccentric preferably has an inner region which performs an eccentric rotational movement. In addition, an outer bearing ring can be provided which surrounds the inner region. At least one bearing is preferably situated between the inner region and the outer bearing ring. Said bearing can be a ball bearing or a roller bearing. During operation, the inner eccentric region of the eccentric performs a rotational movement about the axis. The eccentric arrangement and possibly also the external shape of the eccentric result in an eccentric movement of the surface of the eccentric. Said eccentric movement is transmitted to the outer bearing ring. An eccentric rotational movement of the inner region can be converted by way of a bearing between the inner region and a bearing ring into an eccentric tumbling movement of the bearing ring, without the rotational movement component of the movement of the inner region also being transmitted. The fact that the movement of the bearing ring does not have any rotational movement component makes it possible to reduce shear stresses in the deformable element and inner frictional forces of the pump. The deformable element is tumbled by way of the movement of the eccentric. Preferably only compressive forces and substantially no frictional forces act at a contact face of the eccentric and the deformable element. A corresponding division of the eccentric into an inner eccentric region and a bearing ring is also possible if the eccentric is an outer rotor which is arranged around an (inner) pump housing. It is also possible that the outer bearing ring is dispensed with and the rollers of the bearing roll directly on the deformable element.

The deformable element is preferably arranged between the eccentric and the pump housing in such a way that the eccentric presses the deformable element in regions or in sections against or onto the inner circumferential face of the pump housing in such a way that the at least one displaceable seal is therefore formed. A (linear or full-area) contact exists between the deformable element and the inner circumferential face of the pump housing at the seal, which contact cannot be flowed through by the liquid.

In other words, the deformable element bears completely against the pump housing, with the result that the channel cross section does not have any cross-sectional area in the region of said displaceable seal. Accordingly, the delivery channel is interrupted in the region of the displaceable seal. At least one closed pump volume is therefore also formed within the delivery channel. A closed pump volume means that a section of the delivery channel exists, which section is closed at least on one side (upstream or downstream along the delivery channel). By way of a displacement of the displaceable seal, the at least one closed pump volume is also displaced, with the result that the liquid which is situated in the closed pump volume is delivered. During the operation of the pump, a plurality of closed pump volumes are preferably displaced from the inlet of the pump to the outlet of the pump, in order to deliver the liquid. Therefore, a closed pump volume is formed in the vicinity of the inlet (closed at least on one side in a defined manner) and is then dispersed at the outlet (opened on at least one side again in a defined manner). At the inlet, a closed pump volume is closed (only) on one side downstream by way of a displaceable seal and is connected upstream to the inlet, with the result that liquid can flow through the inlet into the closed pump volume. At the outlet, the closed pump volume is closed (only) on one side, but upstream by way of a seal, and is connected downstream to the outlet, with the result that the liquid can flow through the outlet out of the closed pump volume. In between, on the path of the closed pump volume from the inlet to the outlet, a phase exists, in which the closed pump volume is closed upstream and downstream by way of the at least one displaceable seal.

The deformable element can also be called a deformable diaphragm. Here, the term "diaphragm" does not make any mandatory statement as to whether the deformable element has a full-area extent. The term "diaphragm" is to be understood as an indication that the deformable element is a flexible structure which can be deformed in order to deliver liquid. An elastomer material (for example, rubber or latex) is preferably used as material for the deformable element or the deformable diaphragm. In order to increase the durability and/or to produce and maintain the flexibility, the material of the deformable element can contain additional substances. The deformable element is preferably flexible in all directions (in the axial direction, in the radial direction and in the circumferential direction). It is also possible, however, that the deformable element has a partially directional flexibility. For example, it can have a higher flexibility in the radial direction than in the circumferential direction and in the axial direction. A deformation of the deformable element in one direction typically also necessitates a deformation in other directions. The deformable element expands, for example, in the axial direction and/or in the circumferential direction when it is compressed in the radial direction.

A stationary seal is preferably also provided on the pump, which stationary seal prevents an undesired return flow of the liquid from the outlet to the inlet (counter to the delivery direction). The stationary seal can be provided in a stationary manner with the pump housing and can be positioned between the outlet and the inlet. The deformable element can be clamped or adhesively bonded to the pump housing, for example, in the region of the stationary seal, in order to ensure a long-term fluidtight seal between the pump housing and the deformable element. The stationary seal is fluidtight independently of the position of the eccentric.

By way of the pump, a delivery of liquid in the delivery direction from the inlet to the outlet is preferably possible. By way of a reversal of the rotational direction of the eccentric, a reversal of the delivery direction is optionally also possible (instead of from the inlet to the outlet, in the reverse direction from the outlet back to the inlet).

The deformable element is preferably itself annular or cylindrical. In the direction of the geometric axis, the deformable element then has in each case one annular projection on both sides. In said projections, in each case one rigid centering ring is arranged. The (rigid) centering ring is preferably (slightly) movable with respect to the pump housing if the deformable element with the rigid centering rings is arranged in the pump housing. The rigid centering ring is centered by way of the deformable element within the pump housing. The rigid centering ring clamps the projections of the deformable element between the inner circumferential face of the pump housing and the centering ring (preferably in a completely circumferential manner). As a result, sealing contacts are ensured between the deformable element and the pump housing in the projections of the deformable element. The sealing contacts seal the delivery channel between the pump housing and the deformable element in the axial direction (on both sides). The projections form in each case edge regions of the deformable element on both sides in the direction of the geometric axis of the pump.

Two rigid centering rings preferably exist on the deformable element, which centering rings are arranged on both sides on circumferential projections of the deformable element. If the "at least one" centering ring is mentioned here, this is to also include, in particular, a design variant which has precisely two centering rings which are arranged on both sides on projections of the deformable element. A corresponding wording has been selected for the further elements which are described in conjunction with the centering rings (sealing contact, thickened portion, receptacle, counterholder, contact face, projection, etc.), with the result that "at least one" element of this type is frequently also mentioned here. However, said elements are also preferably configured on both sides, with the result that precisely two sealing contacts, thickened portions, receiving spaces, counterholders, stop faces, projections, etc. are to be disclosed. This type of wording is also to include a pump, in which the described elements and, in particular, a described centering ring are configured only on one side of a center plane of the pump, another (differing) construction of the pump being realized on the other side of the center plane. It is preferred, however, that the pump is constructed symmetrically with respect to the center plane, with the result that all elements which are present on one side of the pump (centering ring, counterholder, sealing contact, thickened portion, receiving space, contact face, projection, etc.) are also present on the other side of the center plane (in a mirror-symmetrical manner).

The described elements (centering rings, counterholder, sealing contact, thickened portion, receptacle, contact face, projection, etc.) are preferably all of annular configuration, moreover. This means that the elements are configured so as to be rotationally symmetrical (at least in sections) with respect to the geometric axis of the pump. In particular in the region of the stationary seal, however, said elements deviate regularly from the rotationally symmetrical shape. Said elements are interrupted there, for example. Here, said elements are called "annular" despite deviations in regions from the rotationally symmetrical shape. Here, therefore, the expression "annular" is to be understood to also mean, in particular, "annular at least in sections", "predominantly annular" and/or "partially annular".

The at least one centering ring preferably lies (at least partially) on an inner side of the deformable element. The at least one projection of the deformable element is therefore preferably pinched between the at least one centering ring and the pump housing. The at least one centering ring supports at least one projection of the deformable element. If a pressure in the delivery channel is increased, the projection or an edge region of the deformable element which is situated there is pinched to a more pronounced manner between the at least one centering ring and the pump housing because more material of the deformable element is pressed (in the axial direction) toward the outside. As a result, the pressing force is increased on sealing contacts between the pump housing and the deformable element. The seal of the sealing contacts is therefore increased when the pressure is increased. The at least one centering ring forms at least one counterholder for the projection of the deformable element. In each case one receiving space (for each counterholder, or for each centering ring) for receiving a projection of the deformable element is formed between the at least one counterholder and the pump housing. The at least one centering ring is preferably rigid. In particular, the centering ring is rigid in comparison with the deformable element, with the result that the deformable element can be pinched between the centering ring and the pump housing without a substantial deformation of the centering ring occurring.

The pressing forces which act on the at least one sealing contact act in the axial direction and therefore parallel to pressing forces which act on the displaceable seal (and possibly also on the stationary seal). Multiple-axis stress states within the deformable element are therefore effectively prevented.

By way of the described design of a pump, a particularly high seal of the pump can be achieved at different pressures within the delivery channel. As a result, high security of the pump against destruction upon freezing of the liquid within the pump is also ensured. The configuration of sealing contacts for lateral (axial) sealing of the delivery channel with centering rings ensures a high seal of the pump with a simultaneously particularly homogeneous stress distribution within the deformable element. In particular, all sealing forces which act in the deformable element (on the sealing contacts, on the displaceable seal and preferably also on the stationary seal) act substantially parallel to one another in the radial direction. As a result, multiple-axis stress states in the deformable element are reduced or avoided. The homogeneous stress distribution and, in particular, also the avoidance of multiple-axis stress states within the deformable element bring about slow ageing and high durability of the pump. By way of the self-centering property of the centering rings with particularly low forces can be achieved, the overall stress level within the deformable element can also be kept low, because the pressing force on the sealing contacts is equalized automatically. This improves the durability and the ageing properties of the pump further.

The pump is particularly preferred if the at least one centering ring has an L-shaped cross section and engages in sections into the deformable element. Two corresponding centering rings with an L-shaped cross-sectional area preferably exist, which engage on both sides (in the projections) into the deformable element.

As has already been stated in the preceding text, the deformable element is preferably of annular or cylindrical shape. At the respective projection, the centering ring preferably engages into the deformable element. One leg of the L-shaped cross-sectional area of the at least one centering ring extends into an inner region of the deformable element. A further leg of the L-shaped cross-sectional area closes off the deformable element in the axial direction. A deformable element of this type is enclosed by way of the centering rings. A design of this type of the centering rings can achieve particularly satisfactory guidance of the deformable element.

The pump is advantageous, furthermore, if the at least one centering ring has a rectangular cross-sectional area and is arranged within the deformable element, and supports the deformable element in at least one projection. Two corresponding centering rings with a rectangular cross-sectional area preferably exist, which are arranged on both sides (in the edge regions) within the deformable element.

A centering ring of this type (with a rectangular cross-sectional area) requires a particularly small amount of additional installation space within the pump housing. In particular, a deformable element having centering rings of this type can also be inserted into the pump housing of a pump, in which there is usually not provision to use a deformable element having a centering ring, because the centering rings within the deformable element require little or even no additional installation space.

It is particularly advantageous in this context if the at least one centering ring is embedded into the deformable element. Two centering rings are preferably embedded in each case on both sides (in the projections) of the deformable element.

The centering rings can be inserted, for example, into recesses of the deformable material of the deformable element. Thus, the at least one centering ring can be connected to the material of the deformable element in a particularly firm and enduring manner. Moreover, one compact component which is closed within itself is formed from the deformable element and the at least one centering ring.

The pump is advantageous, furthermore, if at least one annular projection of the deformable element is braced in the radial direction between the pump housing and the at least one centering ring. Both projections (lying on the outside in the axial direction) of the deformable element are preferably braced in each case in the radial direction between the pump housing and a centering ring.

The pump is advantageous, moreover, if the at least one centering ring bears in the axial direction laterally against the contact face of the pump housing. There are preferably two centering rings which both bear in each case in the axial direction laterally of the deformable element against a contact face.

As a result, no displacement of the at least one centering ring is possible by way of an additional pressure within the delivery channel between the deformable element and the pump housing. The at least one centering ring forms a lateral stop for the deformable element, the centering ring in turn bearing against the contact face of the pump housing. A design of this type is advantageous, in particular, in conjunction with L-shaped centering rings which form an axial termination of the deformable element. In the case of centering rings with a rectangular cross-sectional area which are arranged within the deformable element, a "small" axial movement of the centering rings with respect to the pump housing is normally permissible. The at least one stop face is preferably formed by at least one housing flange on a main part of the pump housing, which closes or terminates the pump housing in the axial direction at least partially.

The pump is advantageous, furthermore, if the at least one centering ring is mounted such that it can be moved in the radial direction. Two centering rings which are mounted such that they can be moved in the radial direction preferably exist.

In particular, the centering rings are not connected to the pump housing and can be displaced in the radial direction with respect to the pump housing. This makes the self-centering properties of the centering rings in relation to the pump housing possible. As a result, the stresses within the deformable element are reduced and, in particular, the sealing action at the sealing contacts between the pump housing and the deformable element is realized with particularly low stresses within the deformable element.

The pump is advantageous, furthermore, if the at least one projection of the deformable element bears in the axial direction laterally against a contact face of the pump housing. Both projections of the deformable element preferably bear (on both sides) in the axial direction laterally against a contact face of the pump housing.

The pump is also advantageous if the pump housing has an inner circumferential face, against which the outer face of the deformable element bears, the axial projections of the deformable element forming annular sealing contacts on the inner circumferential face of the pump housing.

The inner circumferential face is preferably wider in the axial direction than the delivery channel which is formed between the circumferential face and the deformable element. In this context, the width of the delivery channel is the spacing between the two (annular) sealing contacts in the axial direction. As a result, it can be ensured even in the case of a lateral displacement of the sealing contacts (in the axial direction) that the sealing contacts always bear against the circumferential face of the pump housing. A lateral displacement of this type of the sealing contacts can occur, for example, as a result of rising pressure in the delivery channel.

The pump is advantageous, furthermore, if the at least one axial projection of the deformable element has at least one circumferential thickened portion on the outer face. In each case one circumferential thickened portion is preferably configured on both sides on the two projections.

As a result of a circumferential thickened portion in the projections, additional material exists in the projections of the deformable element, by way of which additional material the sealing contacts between the deformable element and the pump housing are formed. The thickened portions act like O-ring seals which seal the delivery channel on both sides. An O-ring seal is a particularly effective seal concept, the sealing action of which is known. It is possible, in particular, to calculate the pressure-dependent sealing action of the sealing contact as a function of the pressure in the delivery channel and to correspondingly dimension the thickened portion and the receptacle.

The pump is advantageous, furthermore, if the at least one centering ring is fastened to the deformable element by way of an integrally joined connection. Two centering rings are preferably fastened to the deformable element by way of an integrally joined connection.

The at least one centering ring can be, in particular, adhesively bonded onto or into the deformable element. It is also possible that the deformable element is cast and/or injection molded on the at least one centering ring. In particular, the at least one centering ring can be encapsulated with the deformable element. As a result, a unitary, compact component is formed from the centering ring and the deformable element, which component can be inserted without problems into the pump housing during the production of the pump.

It is also to be described in this context that the deformable element does not have to consist only of a single material. A composite construction of the deformable element is also conceivable, in which certain regions of the deformable element are manufactured from different materials than other regions of the deformable element. It is also possible that targeted changes of the material are brought about in regions in the deformable element, for example by way of additional inserts, reinforcements or the like. As a result, the deformable element can be adapted in each case in regions exactly to the (local) necessary properties. It is possible, in particular, that deformation regions which are particularly deformable are arranged in the deformable element in a targeted manner. Deformation regions of this type can be produced, for example, by way of elastic inserts in the deformable element. Deformation regions are arranged, in particular, in the vicinity of the projections (between the projections and a central region of the deformable element), because the most pronounced deformations occur in said region during delivery of liquid by way of the pump. In this context, a "central" region denotes a region which lies in the center plane of the pump.

An annular deformable element is also to be described within the context of the invention, which element has a rigid centering ring in at least one projection which lies on the outside in the axial direction, and is suitable, in particular, for a described pump. The deformable element is particularly preferably provided or delimited in the axial direction on both sides by way of in each case one rigid centering ring.

The particular properties of a deformable element having centering rings which are described further above in conjunction with the pump can be transferred in an analogous manner to the deformable element. The particular properties and features in the following text in conjunction with the deformable element can likewise be transferred to the pump.

The centering rings of the deformable element are rigid. This means that the centering rings substantially have a stiffness or strength which is increased with respect to the material of the deformable element. Said increased stiffness or strength is necessary so that the material of the deformable element is pinched between the centering rings and the pump housing. The centering rings can be, for example, made from metal, whereas the deformable element is made from rubber material. However, the centering rings can also be made from a plastic material. It is a precondition merely that the centering rings have a (significantly) increased stiffness or strength with respect to the deformable element, and are suitable for bringing about the functions described further above (centering action, configuration of sealing contacts, etc.).

A motor vehicle is also to be described here, having an internal combustion engine, an exhaust gas treatment apparatus for purifying the exhaust gases of the internal combustion engine, and a pump, the pump being set up to deliver a liquid additive for exhaust gas purification from a tank to an injector, by way of which the liquid additive can be fed to the exhaust gas treatment apparatus.

BRIEF DESCRIPTION OF THE SEVERAL VIEWS OF THE DRAWING

The invention and the technical environment will be explained in greater detail in the following text using the figures. It is to be noted that the figures and, in particular, the proportions which are shown in the figures are merely diagrammatic. The figures serve to illustrate individual features of the described pump. Different design variants which are shown in the figures can be combined with one another in any desired way. In particular, it is not necessary that all features which are shown in a figure are considered in each case as one unit. In the figures.

DESCRIPTION OF THE INVENTION

Figure 1:
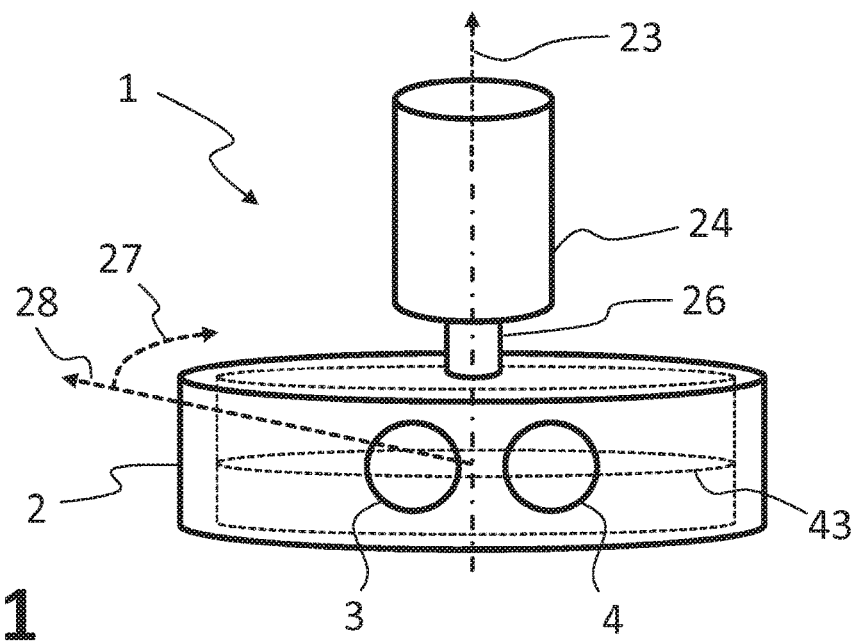
FIG. 1 shows an isometric illustration of the pump.

FIG. 1 shows a described pump in an isometric illustration. For improved orientation in the figures, FIG. 1 defines a coordinate system, consisting of the one geometric axis 23, an axial direction which extends along said axis 23, and a radial direction 28 and a circumferential direction 27. The pump 1 has a pump housing 2 with an inlet 3 and an outlet 4. A deformable element 7 and an eccentric 5 (both not shown in this figure) are situated in the pump housing 2. A drive 24 is shown here above the pump housing 2, by way of which drive 24 the eccentric 5 can be driven in the pump housing 2 via a drive shaft 26. For improved description of the pump, a center plane 43 is also introduced, in which the pump housing 2, the eccentric 5, the deformable element 7 and a delivery channel 8 of the pump lie, and preferably forms a plane of symmetry for the eccentric 5, the deformable element 7, etc.

Figure 2:
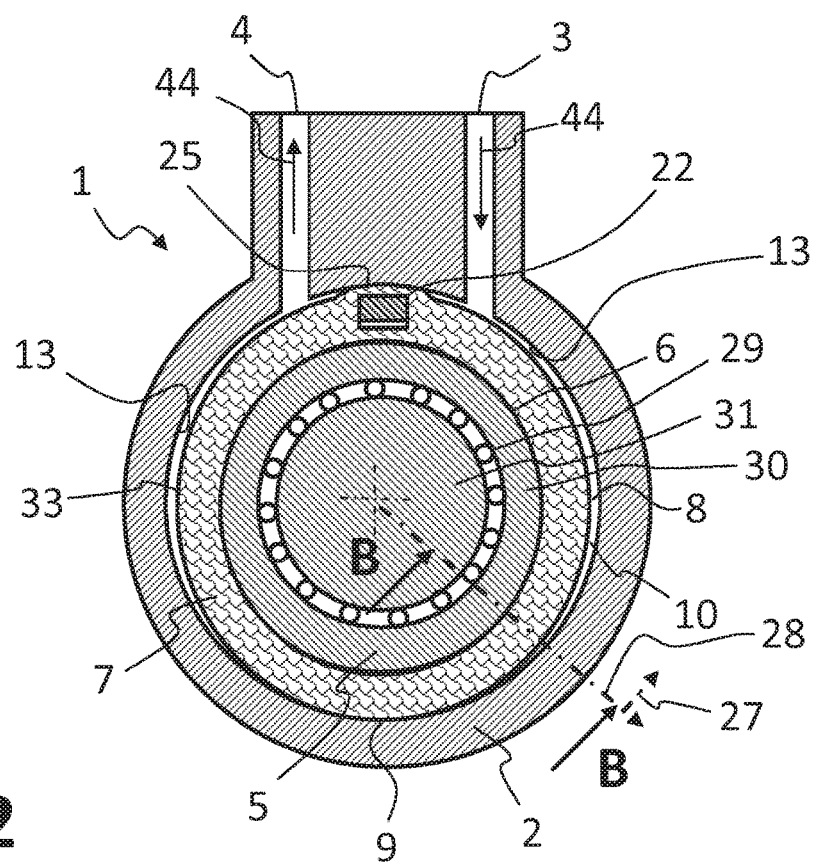
FIG. 2 shows a section through the pump which is shown in FIG. 1.

FIG. 2 shows the pump 1 in a section through the pump housing 2. The pump housing 2 can be seen with the inlet 3 and the outlet 4. For orientation, the radial direction 28 and the circumferential direction 27 are also shown here. The eccentric 5 is arranged within the pump housing 2, which eccentric 5 is divided into an inner eccentric region 29, an outer bearing ring 30 and a bearing 31 which is arranged in between. The deformable element 7 and the delivery channel 8 which connects the inlet 3 and the outlet 4 are situated in a pump gap 11 between an outer face 6 of the eccentric 5 and an inner circumferential face 13 of the pump housing 2. Moreover, the delivery channel 8 is arranged between the deformable element 7 and the inner circumferential face 13 of the pump housing 2. The delivery channel 8 has a displaceable seal 9 which is realized by virtue of the fact that the deformable element 7 is pressed onto the pump housing 2 in regions by the outer face 6 of the eccentric 5. The displaceable seal 9 is displaced by way of a rotation of the eccentric 5. As a result, displaceable pump volumes 10 are displaced within the delivery channel 8, and a delivery of liquid takes place with a delivery direction 44 from the inlet 3 to the outlet 4. A stationary seal 25 is configured between the outlet 4 and the inlet 3, by way of which stationery seal 25 a return flow of liquid from the outlet 4 to the inlet 3 is prevented. The stationary seal can be realized in a manner which is adjusted by way of a pin 22 which presses the deformable element 7 in the region of the stationary seal 25 onto the pump housing 2 independently of the position of the eccentric 5. Further design variants of the stationary seal 25 are also conceivable. The deformable element 7 can also be adhesively bonded to the pump housing 2, for example. It is important merely that the return flow of liquid is prevented effectively at the stationary seal 25.

Figure 3:
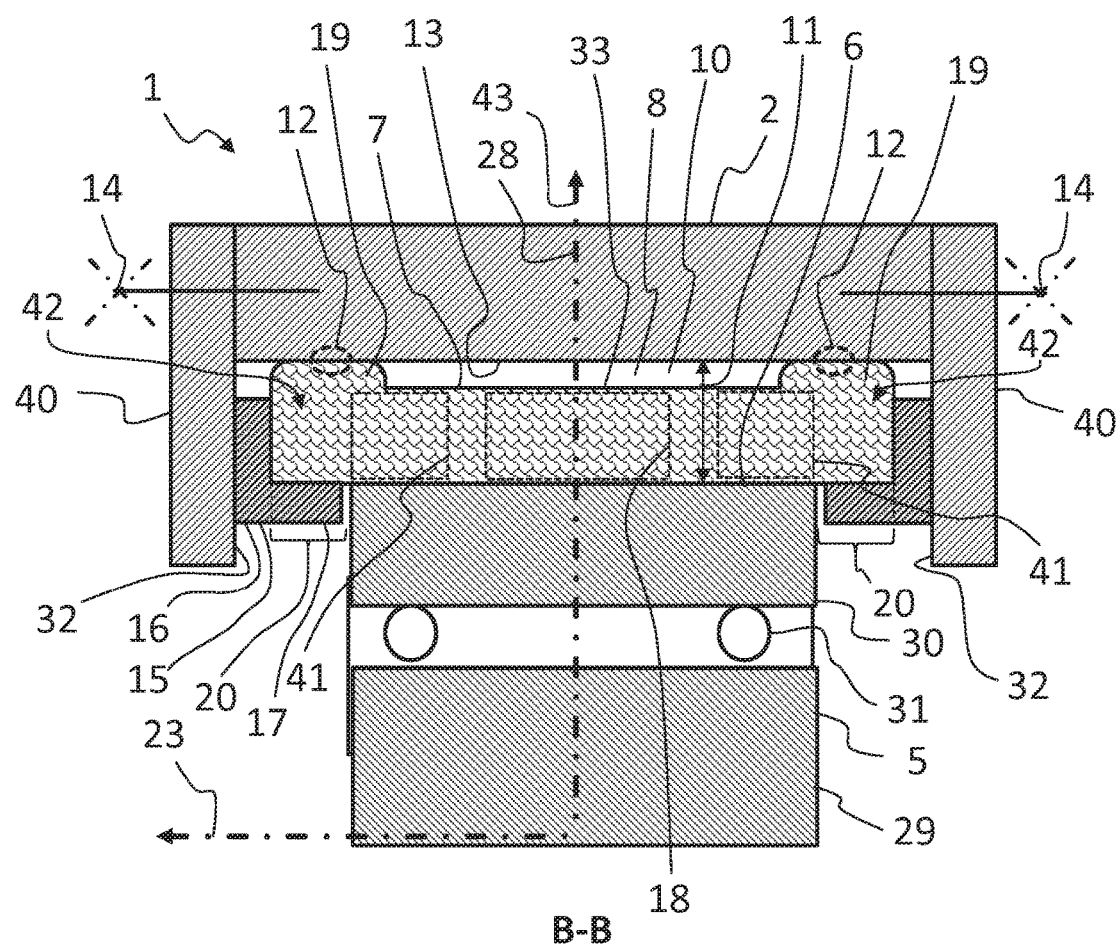
FIG. 3 shows the part section B-B marked in FIG. 2 through a first design variant of a described pump.
Figure 4:
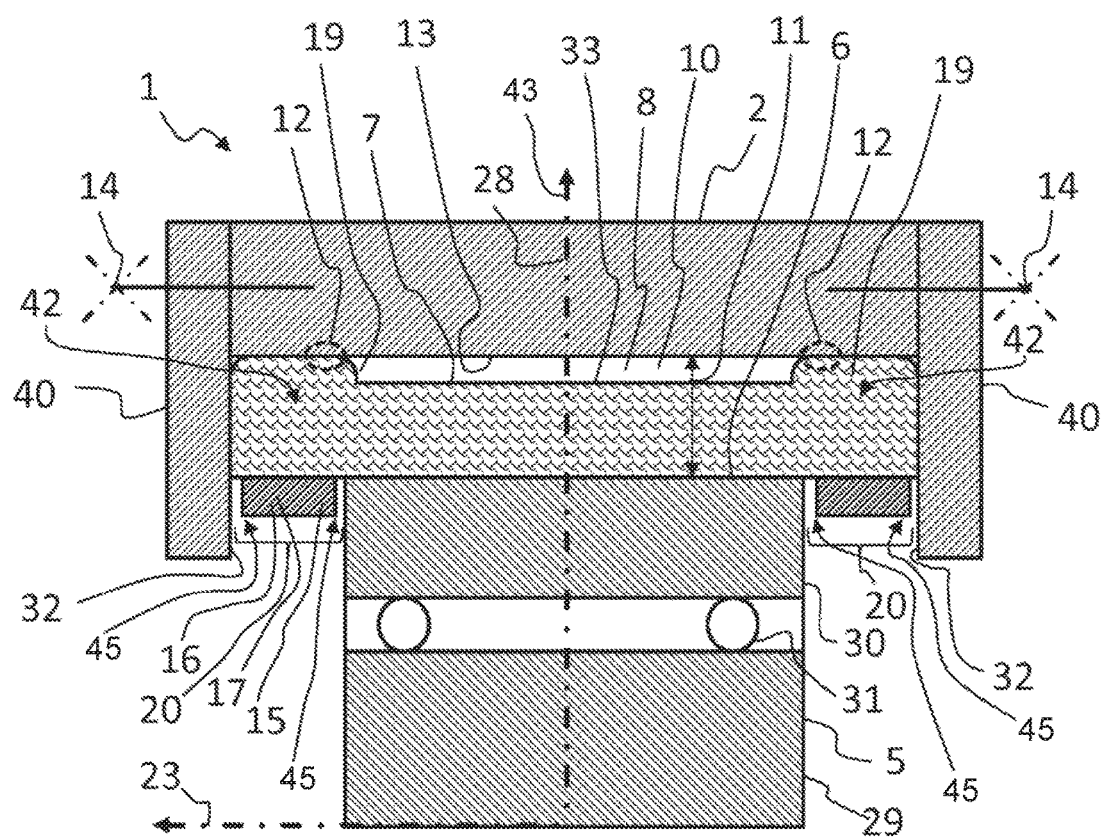
FIG. 4 shows the part section B-B shown in FIG. 2 through a second design variant of a described pump.
Figure 5:
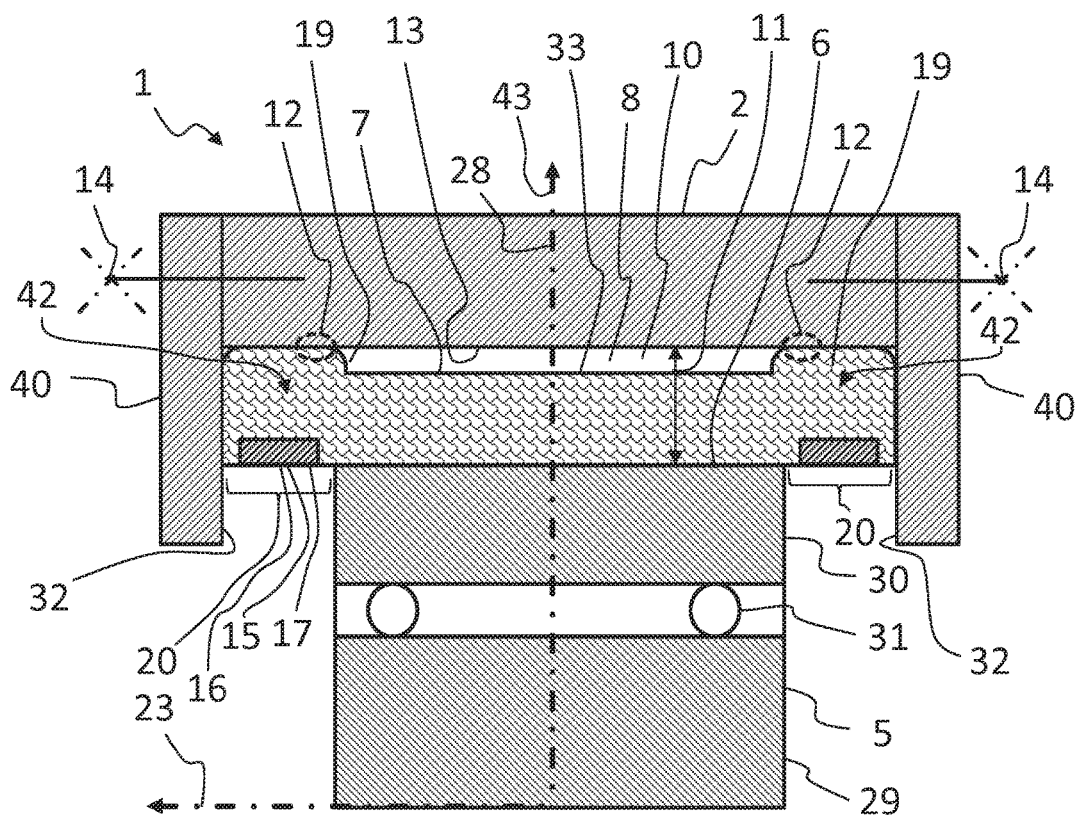
FIG. 5 shows the part section B-B shown in FIG. 2 through a third design variant of a described pump.

FIGS. 3 to 5 in each case show part sections B-B (as shown in FIG. 2) through various design variants of the pump. For orientation, the axial direction 23, the radial direction 28 and the center plane 43 are defined in each case here. In each case the pump 1 with the pump housing 2, the deformable element 7 and the eccentric 5 can be seen. The eccentric 5 is divided in each case into the eccentric region 29, the bearing ring 30 and the bearing 31. The delivery channel 8 exists between the pump housing 2 and the deformable element 7 and is delimited by an inner circumferential face 13 of the pump housing 2 and a channel surface 33 of the deformable element 7. The channel surface 33 and the inner circumferential face 13 are in contact in each case at linear, annular sealing contacts 12, with the result that the fluidtight delivery channel 8 with the pump volume 10 is configured. The deformable element 7 has rigid centering rings 16 on both sides. In each case receiving spaces 42 are configured between the centering rings 16 and the pump housing 2, in which receiving spaces 42 projections 20 of the deformable element 7 are received. The projections 20 of the deformable element have in each case thickened portions 19, in order that the sealing contacts 12 can be configured in a more secure and improved manner. The centering rings 16 form counterholders 15 in each case with respect to the pump housing 2, between which counterholders 15 receiving spaces 42 for the deformable element or the projections 20 of the deformable element 7 are formed.

In the design variant in accordance with FIG. 3, the centering rings 16 in each case have an L-shaped cross-sectional area and bear against contact faces 32 of the pump housing 2, with the result that they cannot be displaced toward the outside in the direction of an axial direction along the geometric axis 23 when a pressure in the delivery channel 8 increases. As a result, an axial boundary for the deformable element 7 is also formed at the same time. The contact faces 32 are formed by housing flanges 40 which are fastened by way of bolts 14 to a main part of the pump housing 2.

Moreover, FIG. 3 shows by way of example that the deformable element can have different zones, in particular a central region 18 and deformation regions 41. In the central region 18, substantially fewer deformations of the deformable element 7 are necessary during the delivery of liquid than is the case in the deformation regions 41. It can therefore be advantageous to configure the deformable element in the different regions with different material properties. For example, the deformable element 7 can have an increased stiffness in the central region 18 and an increased flexibility in the deformation regions 41. This can be realized, for example, by way of elastic inserts in the deformation regions 41 or rigid inserts or reinforcements in the central region 18.

In the design variant in accordance with FIG. 4, the centering rings 16 in each case have a rectangular cross-sectional area and are arranged within the deformable element 7. The centering rings 16 are spaced apart in each case by way of the receiving space 42 from the pump housing 2 and by way of gaps 45 from the eccentric 5, in order to make free mobility of the centering rings 16 possible. The deformable element bears in the axial direction along the geometric axis 23 on the outside directly against contact faces 32 of the pump housing 2. The contact faces 32 of the pump housing 2 are formed by housing flanges 40 which can be fixed, for example, by way of bolts 14 to the main part of the pump housing 2.

The design variant in FIG. 5 corresponds substantially to the design variant of a pump which is shown in FIG. 4. Here, the centering rings 16 with the rectangular cross-sectional area 17 which form the counterholder 15 are embedded into the deformable element 7.

Figure 6:
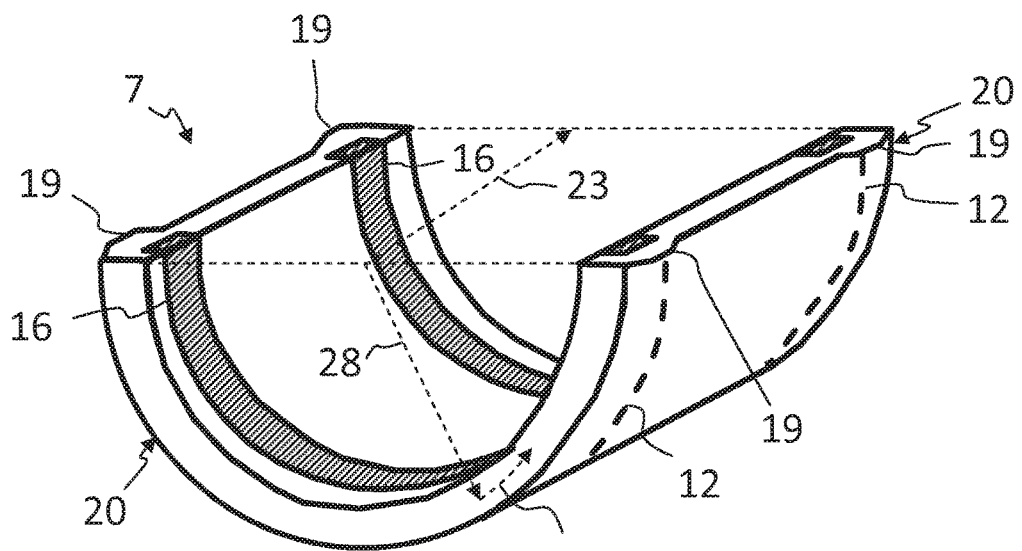
FIG. 6 shows a deformable element for a described pump.

FIG. 6 shows by way of example a particularly simple design variant of the deformable element 7 with the centering rings 16 in a three-dimensional illustration. Only half of the deformable element 7 is shown in FIG. 6, in order that an inner side of the deformable element 7 with the centering rings 16 can be seen. The deformable element 7 of the design variant of the pump from FIG. 5 is shown here. For orientation, in each case the geometric axis 23, the radial direction 28 and the circumferential direction 27 are shown. Two centering rings 16 are embedded in each case in the region of the projections 20 into the deformable element 7. In the region of the projections of the deformable element 7, thickened portions 19 of the deformable element 7 can also be seen, on which in each case the sealing contacts 12 (indicated in a dashed manner) of the deformable element 7 are configured with the pump housing (not shown here).

Figure 7:
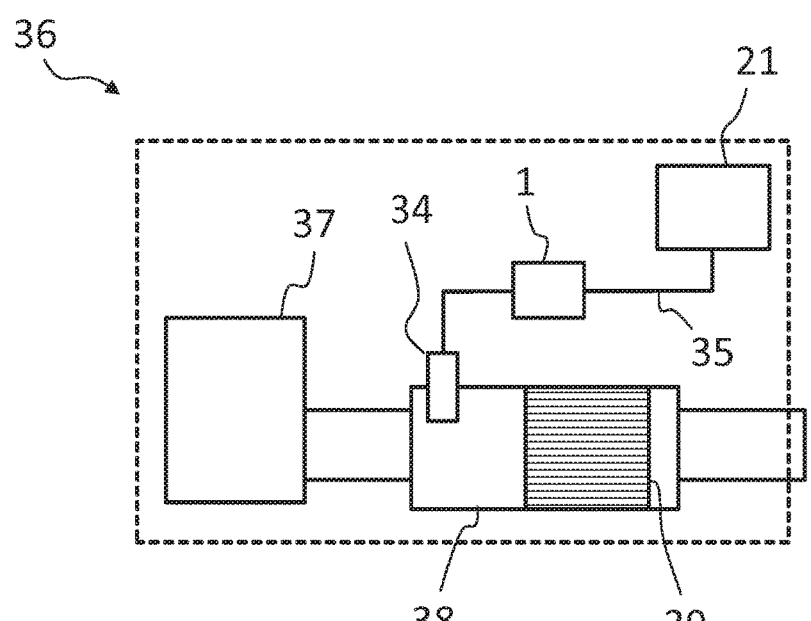
FIG. 7 shows a motor vehicle, having a described pump.

FIG. 7 shows a motor vehicle 36, having an internal combustion engine 37 and an exhaust gas treatment apparatus 38 for purifying the exhaust gases of the internal combustion engine 37. The exhaust gas treatment apparatus 38 has an SCR catalytic converter 39, by way of which the exhaust gases of the internal combustion engine 37 can be purified using the method of selective catalytic reduction. To this end, the exhaust gas treatment apparatus 38 can be fed a liquid additive by way of an injector 34, which liquid additive is provided in a metered manner by a pump 1 along a line 35 from a tank 21.

LIST OF DESIGNATIONS

1 Pump
2 Pump housing
3 Inlet
4 Outlet
5 Eccentric
6 Outer face
7 Deformable element
8 Delivery channel
9 Displaceable seal
10 Pump volume
11 Pump gap
12 Sealing contact
13 Inner circumferential face
14 Bolt
15 Counterholder
16 Centering ring
17 Cross-sectional area
18 Central region
19 Thickened portion
20 Projection
21 Tank
22 Pin
23 Geometric axis
24 Drive
25 Stationary seal
26 Drive shaft
27 Circumferential direction
28 Radial direction
29 Eccentric region
30 Bearing ring
31 Bearing
32 Contact face
33 Channel surface
34 Injector
35 Line
36 Motor vehicle
37 Internal combustion engine
38 Exhaust gas treatment apparatus
39 SCR catalytic converter
40 Housing flange
41 Deformation region
42 Receiving space
43 Center plane
44 Delivery direction
45 Gaps

The invention claimed is:

1. A pump for delivering a liquid, the pump comprising:
at least one pump housing having at least one inlet, at least one outlet, a rotationally symmetrical inner circumferential surface and a geometric axis;
an eccentric being disposed within said at least one pump housing and being rotatable relative to said at least one pump housing about said geometric axis, said eccentric having an outer surface;
a deformable element being disposed in a pump gap between said inner circumferential surface of said at least one pump housing and said outer surface of said eccentric and said deformable element being contacted by said outer surface of said eccentric; and
a delivery channel from said at least one inlet to said at least one outlet, said delivery channel being formed by said deformable element and said inner circumferential surface of said at least one pump housing;
said deformable element being pressed against said at least one pump housing in sections by said outer surface of said eccentric to form at least one displaceable seal of said delivery channel and at least one closed pump volume in said delivery channel;
said at least one displaceable seal and said at least one closed pump volume being displaced along said delivery channel from said at least one inlet to said at least one outlet by a rotation of said eccentric to deliver the liquid;
said deformable element having an inside and sides, said deformable element having at least one projection on at least one of said sides in a direction of said geometric axis beyond said outer surface of said eccentric, and said deformable element having at least one centering ring disposed at said inside in said at least one projection.

2. The pump according to claim 1, wherein said at least one centering ring has an L-shaped cross-sectional area and engages in sections into said deformable element.

3. The pump according to claim 1, wherein said at least one centering ring has a rectangular cross-sectional area and is disposed within said deformable element.

4. The pump according to claim 1, wherein said at least one centering ring is embedded into said deformable element.

5. The pump according to claim 1, wherein said at least one projection of said deformable element has an annular shape, and said at least one annular projection is braced in a radial direction between said at least one pump housing and said at least one centering ring.

6. The pump according to claim 1, wherein said at least one pump housing has a contact surface, and said at least one centering ring bears against said contact surface in the direction of said geometric axis.

7. The pump according to claim 1, wherein said at least one centering ring is mounted movably in a radial direction.

8. The pump according to claim 1, wherein said at least one pump housing has a contact surface, and said at least one projection of said deformable element bears in axial direction laterally against said contact surface.

9. The pump according to claim 1, wherein said outer surface of said deformable element bears against said inner circumferential surface of said at least one pump housing, and said at least one projection of said deformable element forms at least one annular sealing contact at said inner circumferential surface of said at least one pump housing.

10. The pump according to claim 9, wherein said at least one projection of said deformable element has at least one circumferential thickened portion at said outer surface.

11. The pump according to claim 1, wherein said at least one centering ring is fastened to said deformable element by an integrally joined connection.

12. A deformable element for the pump according to claim 1, the deformable element comprising:

an outside of the deformable element;
a geometric axis of the deformable element defining a direction;
at least one projection disposed at said outside in the direction of said geometric axis; and
a centering ring disposed in said at least one projection.

13. A motor vehicle, comprising:
an internal combustion engine;
an exhaust gas treatment apparatus for purifying exhaust gases of said internal combustion engine;
a tank for storing a liquid additive for exhaust gas purification;
an injector for feeding the liquid additive to said exhaust gas treatment apparatus; and
a pump according to claim 1 configured to deliver the liquid additive to said injector.

* * * * *